United States Patent [19]

Forster

[11] 3,854,182

[45] Dec. 17, 1974

[54] PROCESS FOR MANUFACTURING ELECTRICAL CONDENSERS

[75] Inventor: Herbert Forster, Grunbach, Germany

[73] Assignee: Robert Bosch GmbH, Stuttgart, Germany

[22] Filed: Dec. 26, 1973

[21] Appl. No.: 428,404

Related U.S. Application Data

[63] Continuation of Ser. No. 215,121, Jan. 3, 1972, abandoned.

[30] Foreign Application Priority Data

Feb. 25, 1971  Germany............................ 2108988

[52] U.S. Cl................ 29/25.42, 29/25.41, 156/83, 156/85, 156/184, 156/307, 317/260
[51] Int. Cl............................................. B32b 31/26
[58] Field of Search .............. 156/83, 84, 85, 86, 47, 156/48, 184, 53, 56, 187, 194, 280, 307; 117/158, 60, 92; 29/25.41, 25.42, 569; 317/260, 261, 258; 161/235; 264/342 R, 343, 272

[56] References Cited

UNITED STATES PATENTS

| 2,735,970 | 2/1956 | Peck et al. ........................ 161/214 |
| 3,555,642 | 1/1971 | Hagedorn ......................... 29/25.41 |
| 3,648,339 | 3/1972 | Pressinger et al. ................ 29/25.42 |

FOREIGN PATENTS OR APPLICATIONS

| 560,014 | 9/1932 | Germany |
| 973,947 | 7/1960 | Germany |
| 1,022,696 | 1/1958 | Germany |
| 1,564,792 | 12/1966 | Germany |

Primary Examiner—Charles E. Van Horn
Assistant Examiner—F. Frisenda
Attorney, Agent, or Firm—Michael S. Striker

[57] ABSTRACT

Improvement in the process for producing a wound electrical condenser in the form of a coil formed of at least one paper layer impregnated with a dielectric impregnating medium and at least one layer composed of a synthetic resin that shrinks when heated and swells when brought into contact with the dielectric impregnating medium, which condenser is formed by first winding the paper and synthetic resin layers into a tightly wound coil and then impregnating the wound coil with a dielectric impregnating medium at a temperature at which the dielectric medium is liquid and tempering the said impregnated coil by heating it at an elevated temperature and at atmospheric or a subatmospheric pressure, which improvement comprises preliminary impregnating the paper which is to be used in producing the condenser in the form of a loosely wound coil with a molten dielectric impregnating medium that is solid at room temperature and thereafter assembling the thus-impregnated paper coil with the synthetic resin layer into a tightly wound coil and impregnating the same with the liquid dielectric impregnating medium and tempering the thus tightly wound impregnated coil by heating the same at an elevated temperature and at atmospheric or a subatmospheric pressure.

6 Claims, No Drawings

PROCESS FOR MANUFACTURING ELECTRICAL CONDENSERS

This application is a continuation of prior application Ser. No. 215,121 filed on Jan. 3, 1972, now abandoned.

This invention relates to a process for manufacturing electrical condensers containing at least one impregnated paper band and at least one synthetic resin band in superposed relationship which synthetic band under the action of heat undergoes swelling or shrinkage. The electrodes for such condensers can consist of metal foils or of thin layers of metal vaporized on the paper bands or on the synethetic resin bands.

It is known in connection with this type of condenser to fill in the hollow and empty spaces in the paper and in the gaps between the paper and the synthetic resin, after the winding up of the layers of the condenser element and after drying and degassing of the wound condenser, with an impregnating agent in order to increase the dielectric strength of the paper and for preventing electric discharge into the gaps and spaces of the condenser element.

The drying and degassing of the condenser element is carried out in vacuum ($<10^{-1}$ Torr) at a temperature of about 100°–135°C. The gases and vapors thereby formed pass essentially parallel to the surface of the isolating bands and the electrodes and out from the condenser element, i.e., along the same path as that by which the impregnating agent is infiltrated into the gaps and cavities between the layers forming the condenser element.

This infiltration can be impeded or substantially prevented if in the condenser element, there are present synthetic bands which at temperatures of 100°–135°C. i.e., the drying temperature, have already undergone shrinkage along their longitudinal direction whereby the spaces or gaps between the paper and synthetic resin band in the condenser element are narrowed and the exiting of the gases and vapors and also the penetration of the impregnating agent impeded. There is added to this phenomenon that in the contacting or touching of the synthetic foil with the impregnating agent the foils from their edges or margins are caused to swell so that a further narrowing of the spaces at the face of the condenser element takes place before the through impregnation has been completed to form a tight sealing or closing off of the gaps and spaces between the layers of the condenser element. Precautions accordingly must be taken to prevent this from happening. Thus it has been proposed to cool the condenser elements and the impregnating agent to a temperature at which the swelling of the resin only slowly takes place and to use for winding the layers of the condenser together only low pressing pressures. These precautions are time consuming and costly and are not even satisfactory in all cases.

It is an object of the present invention to provide a method for preparing condenser elements avoiding the disadvantages of the art.

It is another object of the invention to provide improved condenser elements.

These and other objects will be apparent from a consideration of the following disclosure.

In accordance with the invention a new process is provided for preparing condenser elements in which the paper bands to be incorporated into the condenser are impregnated before the stacking or winding of the condenser elements takes place. The preimpregnation can be carried out using metallized or metal free and with unwound or wound-up paper bands.

The stacking or winding of the condenser element of the preimpregnated paper and the swellable synthetic bands takes place after the impregnation using the highest possible pressing pressure. There is thereby filled in from the interior of the condenser element any gaps or spaces present therein by the excess impregnating agent present in the preimpregnated paper and through the swelling of the synthetic resin band. After the stacking or winding, the condenser element is warmed in vacuum and any gases included in the gaps and cracks drawn off and the swelling of the foils carried out. If there is used for the preimpregnation of the paper an impregnating agent which is solid at room temperature such as hard wax, then advantageously the stacked or wound condenser element is impregnated in vacuum with an impregnating agent liquid at room temperature such as for instance mineral oil, and the heat treatment is carried out after the second impregnating step. For the tempering of the finished impregnated condenser element, there is employed a temperature which lies above the later working temperature of the condensers.

Comparative tests were carried out with 60 mm wide condenser elements formed by winding up to 8 $\mu$ thick zinc metallized paper bands between which paper bands there have been placed 6 $\mu$ thick polypropylene bands, the condenser having a diameter of 30 mm.

This type of condenser element was in the conventional manner and in accordance with the process of the invention impregnated with hard wax (pour point 95°C) and with vaseline (petrolatum) pour point 52°C) after the wax impregnation. In carrying out the process of the invention, the metallized paper bands are first individually wound into rolls, dried in the known manner and impregnated with hard wax at 115°C. After cooling, the preimpregnated paper bands together with the polypropylene bands, are using the conventional condenser winding machine, worked up to form a condenser element and contact bridges applied on each face using the Schoop's metal spray process. After the spraying on of the condenser bridges, a group of the condenser elements thus formed is tempered at 105°C for twenty four hours in vacuum and another group tempered in air for 15 hours.

A further group of condenser elements were prepared from the same type of metallized but non-preimpregnated paper bands and polypropylene bands and dried by the known methods and then impregnated with the same impregnating agent. The impregnation of these condenser elements with the hard wax (pour point 95°C) was carried out after twenty four hours of drying and degassing of the element in vacuum ($<10^{-1}$ Torr) at 115°C and the after impregnation with vaseline conducted at 70°C. On measuring the voltage resistance (that is that voltage at which self curing breakdowns in the condenser elements takes place) the both differently treated groups of condenser elements showed that the voltage resistance of the condenser element prepared in accordance with the invention of preimpregnated metallized paper band and polypropylene is more than two fold as great as is the voltage resistance of the condenser elements formed from non-impregnated paper bands.

In accordance with a further experiment carried out, it was established that the conventionally treated condenser element is impregnated only in the region of both of its faces in an amount of up to about 20 percent of its volume and has in its interior a large number of electrical breakdowns while the condenser coil prepared in accordance with the invention using preimpregnated paper bands has only a very small number of breakdowns distributed uniformly over the entire coil width.

In accordance with the invention there are suitable for use as impregnating agent for use in the preimpregnation of the paper bands, materials having a pour point >20°C. Materials satisfying this requirement include paraffins, polyolefins, synthetic and natural waxes, pure hydrocarbon waxes, chlorinated hydrocarbon waxes and mixtures of these materials.

As impregnating agent for use in the after impregnation, there may be advantageously used for example any of the following: vaseline, mineral oils, castor oil and cotton seed oil. Under some circumstances, i.e., preferably in condensers with metal foils as condenser electrodes, chlorinated diphenyl and similar materials can also be used. These materials have a high dielectric constant but bad burnout properties so that they are not always suitable for the impregnation of self curing condensers having vaporized, burn out capable metal layers (of a thickness of 0.03 - 0.05 $\mu$) as condenser electrodes.

In addition to polypropylene, as swellable synthetic resin materials, there may be used other polyolefins, for instance polyethylene, polycarbonates, polyesters (polyethylene terephthalate), polystyrene, polysulfones, cellulose acetate, polyimides, polyhydantoin, polyphenyleneoxide and the like.

The paper bands as used in the condenser have a thickness of about 6 to about 20 $\mu$ and preferably of 8–16 $\mu$. The synthetic resin bands have a thickness of about 2 to about 20 $\mu$ and preferably of 3–15 $\mu$.

The individual condenser elements (roll) have a height of 3 - 13 cm and a diameter of 1 - 13 cm. These measurements are of course entirely dependent on the capacity which is to be accommodated in the condenser element. The housing for the condenser element is generally only slightly larger than the condenser element itself.

The process of the invention has been described herein above in connection with the manufacture of condensers, however, the same process can be used for manufacturing insulators for other electrical purposes.

I claim:

1. In a process of producing a wound electrical condenser in the form of a coil formed of at least one paper layer impregnated with a dielectric impregnating medium and at least one layer composed of a synthetic resin that shrinks when heated and swells when brought into contact with the dielectric impregnating medium, which condenser is formed by first winding the paper and synthetic resin layers into a tightly wound coil and then impregnating the wound coil with a dielectric impregnating medium at a temperature at which the dielectric impregnating medium is liquid and tempering the said coil by heating at an elevated temperature and at atmospheric or a subatmospheric pressure, the improvement which comprises preliminarily impregnating the paper which is to be used in producing the condenser in the form of a loosely wound coil with a molten dielectric impregnating medium that is solid at room temperature and thereafter assembling the thus-impregnated paper with the synthetic resin layer into a tightly wound coil and impregnating the same with the liquid dielectric impregnating medium and tempering the thus tightly wound impregnated coil by heating the same at an elevated temperature at atmospheric or a subatmospheric pressure.

2. A process as defined in claim 1 in which the heating is conducted at a subatmospheric pressure.

3. A process as defined in claim 1 in which the synthetic resin layer of the condenser is formed of a resin of the group consisting of polyethylene, polypropylene, polycarbonates, polyethylene terephthalate, polystyrene, polysulfones, cellulose acetate, polyimides, polyhydantoin, and polyphenylene oxide.

4. A process as defined in claim 1 in which the synthetic resin layer is formed of polypropylene.

5. A process as defined in claim 1 in which the dielectric impregnating medium that is solid at room temperature is a substance of the group consisting of paraffin waxes, natural waxes, chlorinated hydrocarbon waxes, polyolefin waxes and mixtures of the same.

6. A process as defined in claim 1 in which the dielectric impregnating medium with which the tightly wound coil of condenser elements is impregnated is a substance of the group consisting of petrolatum, mineral oils, castor oil, cottonseed oil and chlorinated diphenyls.

* * * * *